US011778032B2

(12) United States Patent
Smith

(10) Patent No.: US 11,778,032 B2
(45) Date of Patent: *Oct. 3, 2023

(54) USING VOICE COMMANDS FROM A MOBILE DEVICE TO REMOTELY ACCESS AND CONTROL A COMPUTER

(71) Applicant: Voice Tech Corporation, Tyler, TX (US)

(72) Inventor: Todd R. Smith, Houston, TX (US)

(73) Assignee: Voice Tech Corporation, Tyler, TX (US)

( * ) Notice: Subject to any disclaimer, the term of this patent is extended or adjusted under 35 U.S.C. 154(b) by 86 days.

This patent is subject to a terminal disclaimer.

(21) Appl. No.: 17/477,278

(22) Filed: Sep. 16, 2021

(65) Prior Publication Data

US 2022/0006866 A1    Jan. 6, 2022

Related U.S. Application Data

(63) Continuation of application No. 16/896,673, filed on Jun. 9, 2020, now Pat. No. 11,128,714, which is a
(Continued)

(51) Int. Cl.
*H04L 67/125* (2022.01)
*G06F 9/48* (2006.01)
(Continued)

(52) U.S. Cl.
CPC ............ *H04L 67/125* (2013.01); *G06F 9/451* (2018.02); *G06F 9/4843* (2013.01);
(Continued)

(58) Field of Classification Search
CPC ... H04L 67/125; H04L 63/083; H04L 9/3226; H04L 9/40; G06F 9/451; G06F 9/4843;
(Continued)

(56) References Cited

U.S. PATENT DOCUMENTS 5,960,399 A    9/1999  Barclay et al.
6,138,545 A   10/2000  Dueck
(Continued)

FOREIGN PATENT DOCUMENTS

WO    01/35391    5/2001
WO    03/075125   9/2003

OTHER PUBLICATIONS

USPTO Office Action for U.S. Appl. No. 16/655,047 dated Oct. 18, 2021.
(Continued)

*Primary Examiner* — Huyen X Vo
(74) *Attorney, Agent, or Firm* — Tumey L.L.P.

(57) ABSTRACT

A method of using voice commands from a mobile device to remotely access and control a computer. The method includes receiving audio data from the mobile device at the computer. The audio data is decoded into a command. A software program that the command was provided for is determined. At least one process is executed at the computer in response to the command. Output data is generated at the computer in response to executing at least one process at the computer. The output data is transmitted to the mobile device.

19 Claims, 2 Drawing Sheets

Related U.S. Application Data continuation of application No. 16/655,047, filed on Oct. 16, 2019, which is a continuation of application No. 15/704,871, filed on Sep. 14, 2017, now Pat. No. 10,491,679, which is a continuation of application No. 11/809,998, filed on Jun. 4, 2007, now Pat. No. 9,794,348.

(51) Int. Cl.
  *H04L 9/40* (2022.01)
  *H04M 3/493* (2006.01)
  *H04M 11/00* (2006.01)
  *G06F 9/451* (2018.01)
  *G10L 15/26* (2006.01)

(52) U.S. Cl.
  CPC ........ *H04L 63/083* (2013.01); *H04M 3/4938* (2013.01); *H04M 11/007* (2013.01); *G10L 15/26* (2013.01); *H04M 2203/1033* (2013.01)

(58) Field of Classification Search
  CPC ....... G06F 9/48; H04M 3/4938; H04M 3/493; H04M 11/007; H04M 11/00; H04M 2203/1033; G10L 15/08; G10L 15/26
  See application file for complete search history.

(56) References Cited

U.S. PATENT DOCUMENTS

| | | | |
|---|---|---|---|
| 6,144,938 A | 11/2000 | Surace et al. | |
| 6,233,559 B1 | 5/2001 | Balakrishnan | |
| 6,339,706 B1 | 1/2002 | Tillgren et al. | |
| 6,362,897 B1 | 3/2002 | Berg et al. | |
| 6,404,859 B1 | 6/2002 | Hasan | |
| 6,438,545 B1 | 8/2002 | Beauregard et al. | |
| 6,535,243 B1 | 3/2003 | Tullis | |
| 6,687,734 B1 | 2/2004 | Sellink et al. | |
| 6,714,222 B1 | 3/2004 | Bjorn et al. | |
| 6,882,859 B1 | 4/2005 | Rao et al. | |
| 6,889,191 B2 | 5/2005 | Rodriguez et al. | |
| 6,895,558 B1 | 5/2005 | Loveland | |
| 6,901,270 B1 | 5/2005 | Beach | |
| 6,965,863 B1 | 11/2005 | Zuberec et al. | |
| 6,970,915 B1 | 11/2005 | Partovi et al. | |
| 7,027,987 B1 | 4/2006 | Franz et al. | |
| 7,043,749 B1 | 5/2006 | Davies | |
| 7,047,200 B2 | 5/2006 | Schmid et al. | |
| 7,054,818 B2 | 5/2006 | Sharma et al. | |
| 7,096,185 B2 | 8/2006 | Reichardt et al. | |
| 7,194,259 B2 | 3/2007 | DeLine | |
| 7,203,721 B1 | 4/2007 | Ben-Efraim et al. | |
| 7,376,586 B1 | 5/2008 | Partovi et al. | |
| 7,409,349 B2 | 8/2008 | Wang et al. | |
| 7,487,112 B2 | 2/2009 | Barnes | |
| 7,493,259 B2 | 2/2009 | Jones et al. | |
| 7,539,619 B1 | 5/2009 | Seligman et al. | |
| 7,606,396 B2 | 10/2009 | Miller et al. | |
| 7,640,160 B2 | 12/2009 | Di Cristo | |
| 7,676,368 B2 | 3/2010 | Shizuka | |
| 7,684,985 B2 | 3/2010 | Dominach | |
| 7,689,253 B2 | 3/2010 | Basir | |
| 7,693,720 B2 | 4/2010 | Kennewick et al. | |
| 7,729,916 B2 | 6/2010 | Coffman | |
| 7,751,535 B2 | 7/2010 | Creamer | |
| 7,751,807 B2 | 7/2010 | Lin et al. | |
| 7,822,610 B2 | 10/2010 | Burns | |
| 7,822,612 B1* | 10/2010 | Goodheart | H04M 3/4938 704/270.1 |
| 7,835,901 B2 | 11/2010 | Muramatsu | |
| 7,869,577 B2 | 1/2011 | Amison | |
| 7,895,594 B2 | 2/2011 | Kirilline et al. | |
| 7,949,529 B2 | 5/2011 | Weider et al. | |
| 8,019,324 B2 | 9/2011 | Roth et al. | |
| 8,117,268 B2 | 2/2012 | Jablokov et al. | |
| 8,731,146 B2 | 5/2014 | Moore | |
| 8,942,985 B2 | 1/2015 | Mowatt | |
| 9,037,451 B2 | 5/2015 | Johnson | |
| 9,587,958 B2 | 3/2017 | Campbell et al. | |
| 2002/0052746 A1 | 5/2002 | Handelman | |
| 2002/0065654 A1 | 5/2002 | Grant et al. | |
| 2002/0180798 A1 | 12/2002 | Poor et al. | |
| 2002/0184373 A1 | 12/2002 | Maes | |
| 2003/0007609 A1 | 1/2003 | Yuen et al. | |
| 2003/0046082 A1 | 3/2003 | Siegel | |
| 2003/0069944 A1 | 4/2003 | Barlock et al. | |
| 2003/0101054 A1 | 5/2003 | Davis et al. | |
| 2003/0163321 A1 | 8/2003 | Mault | |
| 2003/0185358 A1 | 10/2003 | Sakamoto | |
| 2003/0187655 A1 | 10/2003 | Dunsmuir | |
| 2003/0191951 A1 | 10/2003 | Cross | |
| 2003/0215115 A1 | 11/2003 | Kim et al. | |
| 2004/0027392 A1 | 2/2004 | Dunn et al. | |
| 2004/0054539 A1 | 3/2004 | Simpson | |
| 2004/0086120 A1 | 5/2004 | Akins | |
| 2004/0176958 A1 | 9/2004 | Salmenkaita et al. | |
| 2004/0258150 A1 | 12/2004 | Krichevsky et al. | |
| 2004/0260562 A1 | 12/2004 | Kujirai | |
| 2005/0027527 A1 | 2/2005 | Junkawitsch et al. | |
| 2005/0049874 A1 | 3/2005 | Coffman et al. | |
| 2005/0091408 A1 | 4/2005 | Parupudi et al. | |
| 2005/0114141 A1 | 5/2005 | Grody | |
| 2005/0129290 A1 | 6/2005 | Lo et al. | |
| 2005/0180464 A1 | 8/2005 | McConnell et al. | |
| 2005/0206513 A1 | 9/2005 | Fallon | |
| 2005/0223101 A1 | 10/2005 | Hayes | |
| 2006/0012677 A1 | 1/2006 | Neven et al. | |
| 2006/0026281 A1 | 2/2006 | Hodgson et al. | |
| 2006/0041926 A1 | 2/2006 | Istvan et al. | |
| 2006/0050933 A1 | 3/2006 | Adam et al. | |
| 2006/0100879 A1 | 5/2006 | Jakobsen | |
| 2006/0111909 A1 | 5/2006 | Maes | |
| 2006/0235700 A1 | 10/2006 | Wong et al. | |
| 2006/0276230 A1 | 12/2006 | McConnell | |
| 2006/0277043 A1 | 12/2006 | Tomes et al. | |
| 2006/0277590 A1 | 12/2006 | Limont | |
| 2007/0005370 A1 | 1/2007 | Elshout | |
| 2007/0047719 A1 | 3/2007 | Dhawan et al. | |
| 2007/0060176 A1 | 3/2007 | Sloo | |
| 2007/0061488 A1 | 3/2007 | Alagappan et al. | |
| 2007/0123191 A1 | 5/2007 | Simpson | |
| 2007/0168188 A1 | 7/2007 | Choi | |
| 2007/0184899 A1 | 8/2007 | Rantapuska | |
| 2009/0222270 A2 | 8/2007 | Likens et al. | |
| 2007/0233842 A1 | 10/2007 | Roberts | |
| 2007/0244892 A1 | 10/2007 | Narancic | |
| 2007/0249365 A1 | 10/2007 | Jendbro | |
| 2008/0021598 A1 | 1/2008 | Daude | |
| 2008/0031475 A1 | 2/2008 | Goldstein | |
| 2008/0065388 A1 | 3/2008 | Cross | |
| 2008/0082332 A1 | 4/2008 | Mallett | |
| 2008/0140415 A1 | 6/2008 | Shostak | |
| 2008/0153465 A1 | 6/2008 | Evermann et al. | |
| 2008/0154611 A1 | 6/2008 | Evermann et al. | |
| 2008/0155637 A1 | 6/2008 | Du Breuil | |
| 2008/0162659 A1 | 7/2008 | Jai et al. | |
| 2008/0163088 A1 | 7/2008 | Pradhan | |
| 2008/0163330 A1 | 7/2008 | Sparrell | |
| 2008/0165937 A1 | 7/2008 | Moore | |
| 2008/0194276 A1 | 8/2008 | Lin et al. | |
| 2008/0243501 A1 | 10/2008 | Hafsteinsson | |
| 2008/0255260 A1 | 10/2008 | Bowman et al. | |
| 2008/0275704 A1 | 11/2008 | Portele et al. | |
| 2008/0288260 A1 | 11/2008 | Cho et al. | |
| 2008/0300884 A1 | 12/2008 | Smith | |
| 2008/0300886 A1 | 12/2008 | Patch | |
| 2009/0182700 A1 | 7/2009 | Hodges | |
| 2015/0199961 A1* | 7/2015 | Arkko | G06F 3/167 704/251 |
| 2016/0042748 A1* | 2/2016 | Jain | G10L 15/30 704/9 |
| 2018/0325469 A1* | 11/2018 | Fountaine | H04N 21/2187 |

(56) References Cited

U.S. PATENT DOCUMENTS

OTHER PUBLICATIONS

USPTO Office Action for U.S. Appl. No. 16/655,054 dated Oct. 26, 2021.
USPTO Office Action for U.S. Appl. No. 16/655,061 dated Nov. 18, 2021.
USPTO Office Action for U.S. Appl. No. 16/677,351 dated Nov. 15, 2021.
USPTO Office Action for U.S. Appl. No. 16/677,332 dated Nov. 16, 2021.
USPTO Office Action for U.S. Appl. No. 16/677,369 dated Nov. 16, 2021.
USPTO Office Action for U.S. Appl. No. 16/710,539 dated Oct. 12, 2021.
USPTO Office Action for U.S. Appl. No. 16/710,692 dated Oct. 12, 2021.
USPTO Office Action for U.S. Appl. No. 16/896,693 dated Oct. 8, 2021.
USPTO Office Action for U.S. Appl. No. 16/896,743 dated Oct. 12, 2021.
Petition For Inter Partes Review of U.S. Pat. No. 9,794,348 No. IPR2020-01739 dated Oct. 1, 2020.
USPTO Office Action for U.S. Appl. No. 16/896,673 dated Dec. 28, 2020.
USPTO Office Action for U.S. Appl. No. 16/655,047 dated Jan. 21, 2021.
USPTO Office Action for U.S. Appl. No. 16/677,351 dated Jan. 21, 2021.
USPTO Office Action for U.S. Appl. No. 16/896,693 dated Jan. 25, 2021.
USPTO Office Action for U.S. Appl. No. 16/896,743 dated Jan. 26, 2021.
USPTO Office Action for U.S. Appl. No. 16/655,054 dated Jan. 29, 2021.
USPTO Office Action for U.S. Appl. No. 16/655,061 dated Feb. 1, 2021.
USPTO Office Action for U.S. Appl. No. 16/677,332 dated Feb. 4, 2021.
USPTO Office Action for U.S. Appl. No. 16/677,369 dated Feb. 4, 2021.
USPTO Office Action for U.S. Appl. No. 16/896,673 dated Feb. 16, 2021.
USPTO Office Action for U.S. Appl. No. 16/655,047 dated Mar. 2, 2021.
USPTO Advisory Action for U.S. Appl. No. 16/655,047 dated Apr. 6, 2021.
USPTO Office Action for U.S. Appl. No. 16/655,047 dated Jun. 14, 2021.
USPTO Office Action for U.S. Appl. No. 16/710,539 dated Jul. 9, 2021.
USPTO Office Action for U.S. Appl. No. 16/710,692 dated Jul. 14, 2021.
USPTO Office Action for U.S. Appl. No. 16/677,351 dated Jul. 20, 2021.
USPTO Office Action for U.S. Appl. No. 16/896,743 dated Jul. 20, 2021.
USPTO Office Action for U.S. Appl. No. 16/896,693 dated Jul. 22, 2021.
USPTO Office Action for U.S. Appl. No. 16/655,054 dated Jul. 26, 2021.
USPTO Office Action for U.S. Appl. No. 16/677,332 dated Jul. 27, 2021.
USPTO Office Action for U.S. Appl. No. 16/655,061 dated Jul. 30, 2021.
USPTO Notice Of Allowance for U.S. Appl. No. 16/896,673 dated Jul. 30, 2021.
USPTO Office Action for U.S. Appl. No. 16/677,369 dated Aug. 2, 2021.
USPTO Issue Notification for U.S. Appl. No. 16/896,673 dated Sep. 1, 2021.
http://www.speech.cs.cmu.edu/speech; "Speech at Carnegie Mellon University", dated Jun. 4, 2007.
http://www.ece.cmu.edu/directory/details/150; "Rob Rutenbar, Electrical and Computer Engineering, Carnegie Mellon University", dated Jun. 4, 2007.
http://technet.microsoft.com/en-us/library/bb267340(d=printer).aspx; :Microsoft Technet: Getting Started with Outlook Voice Access by Tony Smith, dated Jun. 4, 2007.
http://www.echostore.com/skype-usb-to-rj11-adaptor.html; "Au-600 skype usb to rj11 adaptor with forwarding function", dated Jun. 4, 2007.
www.shapeservices.com/en/products/details.php?product=rdm&platform=none; "SHAPE Services—RDM+: Remote Desktop for Mobiles :: Products", dated Jun. 4, 2007.
www.shapeservices.com/en/products/details.php?product=tsm&platform=none; "SHAPE Services—TS Mobiles: Terminal Service Client for Mobiles :: Products", dated Jun. 4, 2007.
http://www.idokorro.com/products/index.shtml; "Idokorro Products", dated Jun. 4, 2007.
http://www.tellme.com/products/TellmeByMobile/FAQs; "Tellme. A Microsoft Subsidary", dated Jun. 4, 2007.
http://corporate.avanquest.co.uk/products/callxpress/seneca.php; "CallXpress Unified Communications: CallXpress Speech 4.5", dated Jun. 4, 2007.
http://cisco.com/en/US/products/ps7271/index.html; "Cisco Unified Mobile Communicator—Products & Services —Cisco Systems: Unified Communications on Mobile Handsets", dated Jun. 4, 2007.
http://www.radvision.com/Products/3GProductsApplications/PCtoMobile; "Visual Connectivity Wherever You Are", dated Jun. 4, 2007.
http://www.v-enable.com/; "Introducing Enhanced Directory Assistance From V-ENABLE", dated Jun. 4, 2007.
http://www.promptu.com; "Promptu: If You Could Ask for Anything, What Would You Ask for?", dated Jun. 4, 2007.
http://research.microsoft.com/srg; "Speech Technology (Redmond)", dated Jun. 4, 2007.
http://www.nuance.com/naturallyspeaking/professional/features.asp; "Nuance—Dragon NaturallySpeaking Professional 9—Key Features", dated Jun. 4, 2007.
http://www.microsoft.com/enable/products/windowsvista/speech.aspx; "Windows Speech Recognition in Windows Vista", dated Jun. 4, 2007.
http://www.sayittoplayit.com/; "One Voice Technologies, Inc.—Media Center Communicator", dated Jun. 4, 2007.
USPTO Office Action for U.S. Appl. No. 11/809,998 dated Nov. 16, 2010.
USPTO Office Action for U.S. Appl. No. 11/809,998 dated May 3, 2011.
USPTO Office Action for U.S. Appl. No. 11/809,998 dated Jul. 26, 2011.
USPTO Office Action for U.S. Appl. No. 11/809,998 dated Nov. 14, 2011.
USPTO Office Action for U.S. Appl. No. 11/809,998 dated Jun. 3, 2013.
USPTO Office Action for U.S. Appl. No. 11/809,998 dated May 25, 2016.
USPTO Office Action for U.S. Appl. No. 11/809,998 dated Jan. 6, 2017.
USPTO Office Action for U.S. Appl. No. 11/809,998 dated Apr. 19, 2017.
USPTO Office Action for U.S. Appl. No. 11/809,998 dated May 19, 2017.
USPTO Notice Of Allowance for U.S. Appl. No. 11/809,998 dated Jun. 16, 2017.
USPTO Issue Notification for U.S. Appl. No. 11/809,998 dated Sep. 27, 2017.
USPTO Office Action for U.S. Appl. No. 15/704,871 dated Apr. 5, 2019.
USPTO Office Action for U.S. Appl. No. 15/704,871 dated Sep. 11, 2019.

(56) References Cited

OTHER PUBLICATIONS

USPTO Notice Of Allowance for U.S. Appl. No. 15/704,871 dated Oct. 15, 2019.
USPTO Issue Notification for U.S. Appl. No. 15/704,871 dated Nov. 6, 2019.
Petition For Inter Partes Review of U.S. Pat. No. 10,491,679 No. IPR2020-01018 dated Jun. 5, 2020.
Tao Guan, Ed Zaluska, and David De Roure, A Grid Service Infrastructure for Mobile Devices, Electronics and Computer Science, University of Southampton, UK, Published in 2005 First International Conference on Semantics, Knowledge and Grid (2005), per https://ieeexplore.ieee.org/abstract/document/4125830.
Nader, Jonar, Prentice Hall's Illustrated Dictionary of Computing: Internet Update, excerpted (Prentice Hall 1998, Third Edition).
Microsoft Computer Dictionary, excerpted (Microsoft Press, 2002, Fifth Edition).
M. Frans Kaashoek et al., Server Operating Systems, EW 7: Proceedings of the 7th workshop on ACM SIGOPS European workshop: Systems support for worldwide applications, pp. 141-148 (Sep. 1996), available at https://dl.acm.org/doi/abs/10.1145/504450.504478.
Douglas E. Comer, Computer Networks and Internets With Internet Applications, excerpted (Prentice Hall 2001, Third Edition).
Brad A. Myers et al., Using Hand-Held Devices and PCs Together, dated Aug. 9, 2001.
Chris Schmandt et al., Impromptu: Managing Networked Audio Applications for Mobile Users, MIT Media Laboratory Speech Interface Group.
USPTO Office Action for U.S. Appl. No. 16/655,047 dated Jun. 24, 2020.
USPTO Office Action for U.S. Appl. No. 16/655,054 dated Jul. 1, 2020.
USPTO Office Action for U.S. Appl. No. 16/655,061 dated Jul. 7, 2020.
USPTO Office Action for U.S. Appl. No. 16/896,673 dated Aug. 21, 2020.
USPTO Office Action for U.S. Appl. No. 16/677,332 dated Sep. 1, 2020.
USPTO Office Action for U.S. Appl. No. 16/677,369 dated Sep. 1, 2020.
USPTO Office Action for U.S. Appl. No. 16/896,693 dated Sep. 1, 2020.
USPTO Office Action for U.S. Appl. No. 16/677,351 dated Sep. 2, 2020.
USPTO Office Action for U.S. Appl. No. 16/655,047 dated Sep. 15, 2020.
USPTO Office Action for U.S. Appl. No. 16/896,743 dated Sep. 29, 2020.

\* cited by examiner

USING VOICE COMMANDS FROM A MOBILE DEVICE TO REMOTELY ACCESS AND CONTROL A COMPUTER

CROSS-REFERENCE TO RELATED APPLICATIONS

This application is a continuation of U.S. application Ser. No. 16/896,673 filed on Jun. 9, 2020, which is a continuation of U.S. application Ser. No. 16/655,047 filed on Oct. 16, 2019, which is a continuation of U.S. Pat. No. 10,491,676 issued on Nov. 26, 2019, which is a continuation of U.S. Pat. No. 9,794,348 issued on Oct. 17, 2017, the entire disclosures of which are incorporated by reference.

STATEMENT REGARDING FEDERALLY SPONSORED RESEARCH OR DEVELOPMENT

Not applicable.

BACKGROUND OF THE INVENTION

Field of the Invention

The present invention pertains to the field of computer operating systems, and more specifically to a system for using voice commands from a mobile device to remotely access and control a computer, and a method of use that allows a person to use voice commands from a mobile device to remotely access and control a computer.

Background of the Related Art

Systems for allowing a person to use voice commands from a mobile device to remotely access and control a computer are known in the art. However, such prior art systems are application-specific, meaning they are configured to allow the person to use voice commands from a mobile device to remotely access and control a specific application at a computer. Therefore, the prior art systems require the person to have multiple mobile devices and/or systems to remotely access and control the different applications at a computer. Additionally, the prior art systems limit the audible and visible feedback the person can receive from a computer while using voice commands from a mobile device to remotely access and control the computer.

SUMMARY OF THE INVENTION

In accordance with the present invention, a system is provided for using voice commands from a mobile device to remotely access and control a computer, and a method of use is provided that allows a person to use voice commands from a mobile device to remotely access and control a computer.

In particular, a system and method of use are provided that allow a person to use voice commands from a mobile device to remotely interact with a computer.

In accordance with an exemplary embodiment of the present invention, a method of using voice commands from a mobile device to remotely access and control a computer is provided. The method includes receiving audio data from the mobile device at the computer. The audio data is decoded into a command. A software program that the command was provided for is determined. At least one process is executed at the computer in response to the command. Output data is generated at the computer in response to executing at least one process at the computer. The output data is transmitted to the mobile device.

The present invention provides many important technical advantages. One important technical advantage of the present invention is a system that allows a person to use voice commands from a mobile device to remotely access and control a computer and see and hear the images and sounds generated at the computer, in response to the voice commands, in a manner similar to what the person would see and hear, if the person were directly and locally accessing and controlling the computer using a voice command system.

Those skilled in the art will further appreciate the advantages and superior features of the invention together with other important aspects thereof on reading the detailed description that follows in conjunction with the drawings.

BRIEF DESCRIPTION OF THE SEVERAL VIEWS OF THE DRAWINGS

For a detailed description of the preferred embodiments of the invention, reference will now be made to the accompanying drawings in which.

DETAILED DESCRIPTION OF THE INVENTION

Figure 1:
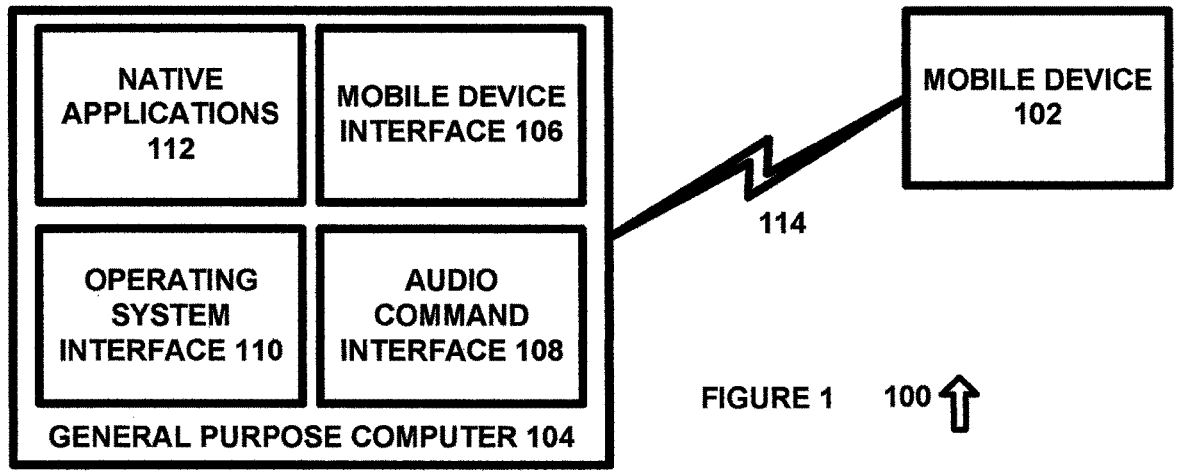
FIG. 1 is a diagram of a system for using voice commands from a mobile device to remotely access and control a computer in accordance with an exemplary embodiment of the present invention.

In the description that follows, like parts are marked throughout the specification and drawings with the same reference numerals, respectively. The drawing figures might not be to scale, and certain components can be shown in generalized or schematic form and identified by commercial designations in the interest of clarity and conciseness.

FIG. 1 is a diagram of system 100 for using voice commands from a mobile device to remotely access and control a computer in accordance with an exemplary embodiment of the present invention. System 100 allows a person to use voice commands from a mobile device to remotely access and control a computer, whereby the person can operate the operating system at the computer, operate native applications at the computer, and see and hear the images and sounds generated at the computer in response to the voice commands.

System 100 includes mobile device 102, which can be a suitable mobile device such as a cellular phone, smart phone, touch-screen device, personal digital assistant, tablet device, notebook device, laptop device, or other suitable mobile device that allows communication with a computer via a wireless or wire-line network or a suitable combination of a wireless and wire-line network.

System 100 also includes general purpose computer 104, which can be a general purpose processing platform or other suitable processing platforms. General purpose computer 104 includes mobile device interface 106, audio command interface 108, operating system interface 110, and native applications 112, each of which can be implemented in hardware, software, or a suitable combination of hardware and software, which can be one or more software systems operating on a general purpose processing platform. As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications or on two or more processors, or other suitable software structures. In one exemplary embodiment, software can include one or more lines of code or other suitable software structures operating in a general purpose software application, such as an operating system; and one or more lines of code or other suitable software structures operating in a specific purpose software application.

Mobile device 102 is coupled to general purpose computer 104 via communications medium 114. As used herein, "communications medium" can include a wire-line communications medium, a wireless communications medium, an optical communications medium, an analog communications medium, a digital communications medium, other suitable communications media or a suitable combination of communications media. As used herein, the term "coupled" and its cognate terms such as "couples" or "couple," can include a physical connection (such as a wire, optical fiber, or a telecommunications medium), a virtual connection (such as through randomly assigned memory locations of a data memory device or a hypertext transfer protocol (HTTP) link), a logical connection (such as through one or more semiconductor devices in an integrated circuit), or other suitable connections. In one exemplary embodiment, a communications medium can be a network or other suitable communications media.

Mobile device interface 106 receives voice or data information from mobile device 102. In one exemplary embodiment, mobile device interface 106 is configured to monitor communications medium 114 interface devices, or other suitable mechanisms for interfacing with communications medium 114. In this exemplary embodiment, mobile device interface 106 can monitor a public switched telephone network (PSTN) modem that responds to ring signals when a call is being made from mobile device 102 to general purpose computer 104, such as through a dedicated telephone number. Mobile device interface 106 can answer or monitor the answering of the PSTN modem and determine whether mobile device 102 is calling or whether some other device, such as a fax machine or other computer is calling. Likewise, mobile device interface 106 can operate or monitor a network connection, such as over a local area network, DSL modem, cable modem or other suitable internet or network connections and can determine whether mobile device 102 has transmitted data to general purpose computer 104. In one exemplary embodiment, mobile device interface 106 can receive addressing data, such as through the use of keypad entries or other data control devices that can transmit network addressed data to general purpose computer 104 at a predetermined network address. Mobile device interface 106 can receive such network addressed data and determine whether it has been transmitted by mobile device 102 or other suitable devices. If it is determined by mobile device interface 106 that mobile device 102 has transmitted data to general purpose computer 104, mobile device interface 106 establishes a session with mobile device 102 to allow mobile device 102 to interact with general purpose computer 104.

Audio command interface 108 receives audio commands from mobile device interface 106. In one exemplary embodiment, audio command interface 108 can receive data from mobile device interface 106 and detect audio commands in the data. For example, mobile device interface 106 may receive data from mobile device 102 without determining whether the data includes audio data, keypad entry data, keyboard entry data, or other suitable data. Likewise, mobile device interface 106 can perform voice recognition and other suitable processing and can provide voice data to audio command interface 108.

Audio command interface 108 determines whether voice data corresponds to an audio command. In one exemplary embodiment, audio command interface 108 can determine whether voice data corresponds to one of two or more predetermined audio commands. Audio command interface 108 can also execute such detected commands. Audio command interface 108 can also provide a list of available commands to the person using mobile device 102, such as by presenting prompts to the person, by allowing the person to request a list of available audio commands, or in other suitable manners. Likewise, audio command interface 108 can include one or more states, such that certain audio commands are available depending upon the state of audio command interface 108. In this exemplary embodiment, when audio command interface 108 is being used to access and control a native application 112 or operating system interface 110, audio command interface 108 may change states to provide different audio commands to the person using mobile device 102.

Operating system interface 110 allows audio command interface 108 to activate various operating system commands. In one exemplary embodiment, audio command interface 108 can include a file of available operating system commands that can be matched with voice data, such as operating system commands that would otherwise be available to a person directly and locally accessing and controlling general purpose computer 104 using a voice command system. For example, an operating system command may include a file search command that can be activated through audio command interface 108 and operating system interface 110. In this exemplary embodiment, the person using mobile device 102, after establishing a session with mobile device interface 106, could state the command "search", and audio command interface 108 could cause the search functionality of operating system interface 110 to be activated. The person could then further identify information to be searched for such as documents, pictures, videos, all files and folders, or other suitable processes can be performed.

Native applications 112 can include one or more native applications accessed and controlled at general purpose computer 104. In one exemplary embodiment, native applications 112 can be loaded into or interface with audio command interface 108, such as by installing an applications program interface (API) or other suitable data into audio command interface 108 that identifies native applications 112 and provides available commands for audio command interface 108 to interface with native applications 112. In this exemplary embodiment, certain predetermined commands for native applications 112 can be provided, such as commands that one person would be authorized to use, whereas commands another person would not be authorized to use can be inhibited or blocked for that person (such as a print command, a command allowing the person to turn off general purpose computer 104, or other suitable commands).

In operation, system 100 allows a person to use voice commands from mobile device 102 to remotely access and control general purpose computer 104 over communications medium 114. Unlike prior art systems that require voice command interoperability be provided for each separate native application, system 100 allows mobile device 102 to remotely access and control both operating system functions and native applications at general purpose computer 104. In this manner, the person using mobile device 102 can see and hear the images and sounds generated at general purpose computer 104, regardless of the native application or operating system function that is used to generate such images and sounds. As such, each native application 112 or operating system of general purpose computer 104 is not required to be configured to remotely interact with mobile device 102. Likewise, where native applications at general purpose computer 104 are configured to remotely interact with mobile device 102, system 100 allows mobile device 102 to switch between native applications that are configured and operating system functions and native applications that are not configured for interaction with mobile device 102.

Figure 2:
FIG. 2 is a diagram of a system for providing a mobile device interface in accordance with an exemplary embodiment of the present invention.

FIG. 2 is a diagram of system 200 for providing a mobile device interface in accordance with an exemplary embodiment of the present invention. System 200 includes network interface 202, native application video output conversion 204, and native application audio output conversion 206, each of which can be implemented in hardware, software, or a suitable combination of hardware and software, which can be one or more software systems operating on a general purpose processing platform.

Network interface 202 provides an interface between general purpose computer 104 and communications medium 114 or other suitable networks. In one exemplary embodiment, network interface 202 can monitor a modem, such as a PSTN modem, cable modem, DSL modem, or other suitable modems for incoming data traffic that indicates that mobile device 102 or other suitable devices are attempting to interface with general purpose computer 104. Likewise, network interface 202 can monitor a network card, such as a local area network connection, network interface card, or other suitable devices. Network interface 202 receives the incoming mobile device 102 data and performs voice or data recognition on the data.

Native application video output conversion 204 receives native application video output from general purpose computer 104, such as video data that has been generated by a native application, and converts the video data into a format for transmission to mobile device 102 or other suitable mobile devices. In one exemplary embodiment, native application video output conversion 204 can receive screen information from general purpose computer 104 operating under a native application or operating system command and can convert the screen information into a format for transmission to mobile device 102. Likewise, native application video output conversion 204 can convert the native application video output into a different format for viewing at mobile device 102, such as a format that excludes data that would not provide additional functionality, but would otherwise require excessive bandwidth requirements for transfer to mobile device 102.

Native application audio output conversion 206 receives native application audio output from general purpose computer 104, such as audio data that has been generated by a native application, and converts the audio data into a format for transmission to mobile device 102 or other suitable mobile devices. Native application audio output conversion 206 is coordinated with native application video output conversion 204, so as to provide audio output that is correlated with video output, allowing video conferencing, playback of audio-visual data, or other suitable processes. Likewise, native application audio output conversion 206 can convert the native application audio output into a different format for hearing at mobile device 102, such as a format that excludes data that would not provide additional functionality, but would otherwise require excessive bandwidth requirements for transfer to mobile device 102.

In operation, system 200 allows a person using mobile device 102 to remotely provide commands to general purpose computer 104 to cause native applications or operating system functions to change state or otherwise perform suitable functions at general purpose computer 104, while at the same time allowing the person using mobile device 102 to see and hear the images and sounds generated by the native applications or operating system functions at general purpose computer 104.

Figure 3:
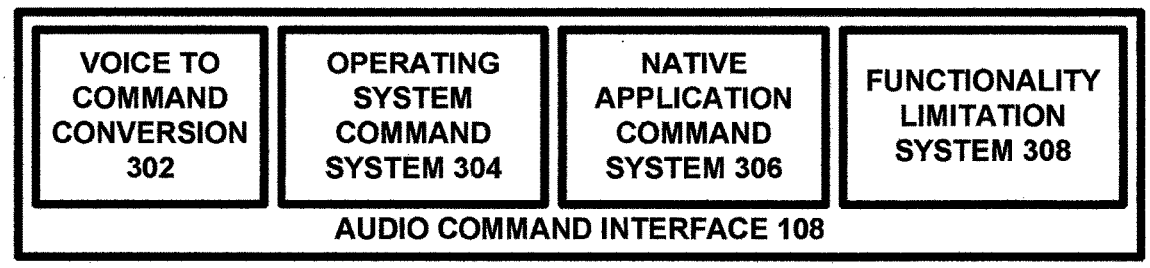
FIG. 3 is a diagram of a system for providing an audio command interface in accordance with an exemplary embodiment of the present invention.

FIG. 3 is a diagram of system 300 for providing an audio command interface in accordance with an exemplary embodiment of the present invention. System 300 allows voice commands to be provided to the operating system or native applications operating at general purpose computer 104.

System 300 includes voice to command conversion 302, operating system command system 304, native application command system 306 and functionality limitation system 308, each of which can be implemented in hardware, software, or a suitable combination of hardware and software, which can be one or more software systems operating on a general purpose processing platform. Voice to command conversion 302 receives voice data and determines whether the voice data matches one or more predetermined commands. In one exemplary embodiment, voice to command conversion 302 can determine if the voice data is in a proper sequence to be received as a command, has occurred at a point in time to be interpreted as a command, and can perform confirmatory functions such as repeating the command to the person or other suitable functions. In one exemplary embodiment, voice to command conversion 302 can include one or more states, such as states based on an operating system function, a native application, or other function being accessed and controlled at a present time. In this exemplary embodiment, when the person using mobile device 102 is accessing and controlling a certain operating system function or native application at general purpose computer 104, voice to command conversion 302 can limit the number of commands to a predetermined set of commands relevant to the operating system function or native application. Likewise, voice to command conversion 302 can allow the person using mobile device 102 to obtain a list of available commands, such as by stating "list", can allow the person to request confirmation of commands, such as by requesting "confirm," or can perform other suitable functions.

Operating system command system 304 allows a person to use voice commands from mobile device 102 to remotely access and control the operating system at general purpose computer 104. In one exemplary embodiment, operating system command system 304 can allow the person to perform predetermined operating system commands such as a search command, a run command, a program list command, or other suitable commands. In this exemplary embodiment, the person can speak a command that causes the operating system to generate a display of a predetermined number of last programs that were run by the operating system. Likewise, operating command system 304 can interact with the person, such as allowing the person to obtain a list of available operating system commands, allowing the person to query the operating system to obtain a list of native applications that are available for operation, or in other suitable manners.

Native application command system 306 allows a person to use voice commands from mobile device 102 to remotely access and control the native applications at general purpose computer 104. In one exemplary embodiment, native application command system 306 can include one or more application programming interfaces having a predetermined set of commands that can be used to operate a native application. In this exemplary embodiment, native application command system 306 can allow the person to request a list of available native application commands, can confirm whether a spoken command received from the person was meant to be one of two or more similar native application commands, or can perform other suitable functions. For example, native application command system 306 can request the person to repeat a command that was not understood, can ask the person to choose between one of two similar commands, can allow the person to navigate backwards a predetermined number of command steps or reset, can provide other suitable functions.

Functionality limitation system 308 interacts with network interface 202 to perform password or other authorization processes, requiring the person using mobile device 102 to be authenticated before being allowed access and control of general purpose computer 104 in whole or in part. In one exemplary embodiment, speech or image data can be received and compared with stored speech or image data. The speech or image data can also include a plurality of sets of speech or image data. In this exemplary embodiment, the speech data can be selected from a set that causes one of a plurality of predetermined processes to be performed, such as a first phrase or term that causes a first native application to be executed, a second phrase or term that causes a second native application to be executed, and so forth. Likewise, certain terms or phrases can be used in public to provide limited functionality to native applications and other terms or phrases can be used in private to provide access and control of additional native applications or functions of such native applications.

In another exemplary embodiment, files of image data showing different authorized persons or authorized persons in different states (such as with long hair, short hair, unkempt hair, with or without facial hair or make-up, or in other states) can also or alternatively be provided; and an image of the person using mobile device 102 can be transmitted from mobile device 102 to general purpose computer 104 to authorize access and control of general purpose computer 104. The transmitted image data can be compared to the stored image data and it can be determined whether the data matches within a predetermined tolerance, such as by using traditional image data comparison algorithms or processes that identify a plurality of points or features in the facial images for comparison. Combinations of audio and video data can also or alternatively be used for password or other authorization processes and other suitable functions.

In operation, system 300 provides an audio command interface that allows a person to use voice commands from mobile device 102 to access and control native applications or operating system functions at general purpose computer 104. Audio command interface 108 provides the person with the ability to access and control both native applications that are configured for direct interaction with a mobile device as well as native applications that are not configured for direct interaction with a mobile device, allowing a person to start applications, to switch between applications, to shut down applications, or to perform other suitable functions. System 300 can also limit the access and control the person using mobile device 102 can have of general purpose computer 104.

Figure 4:
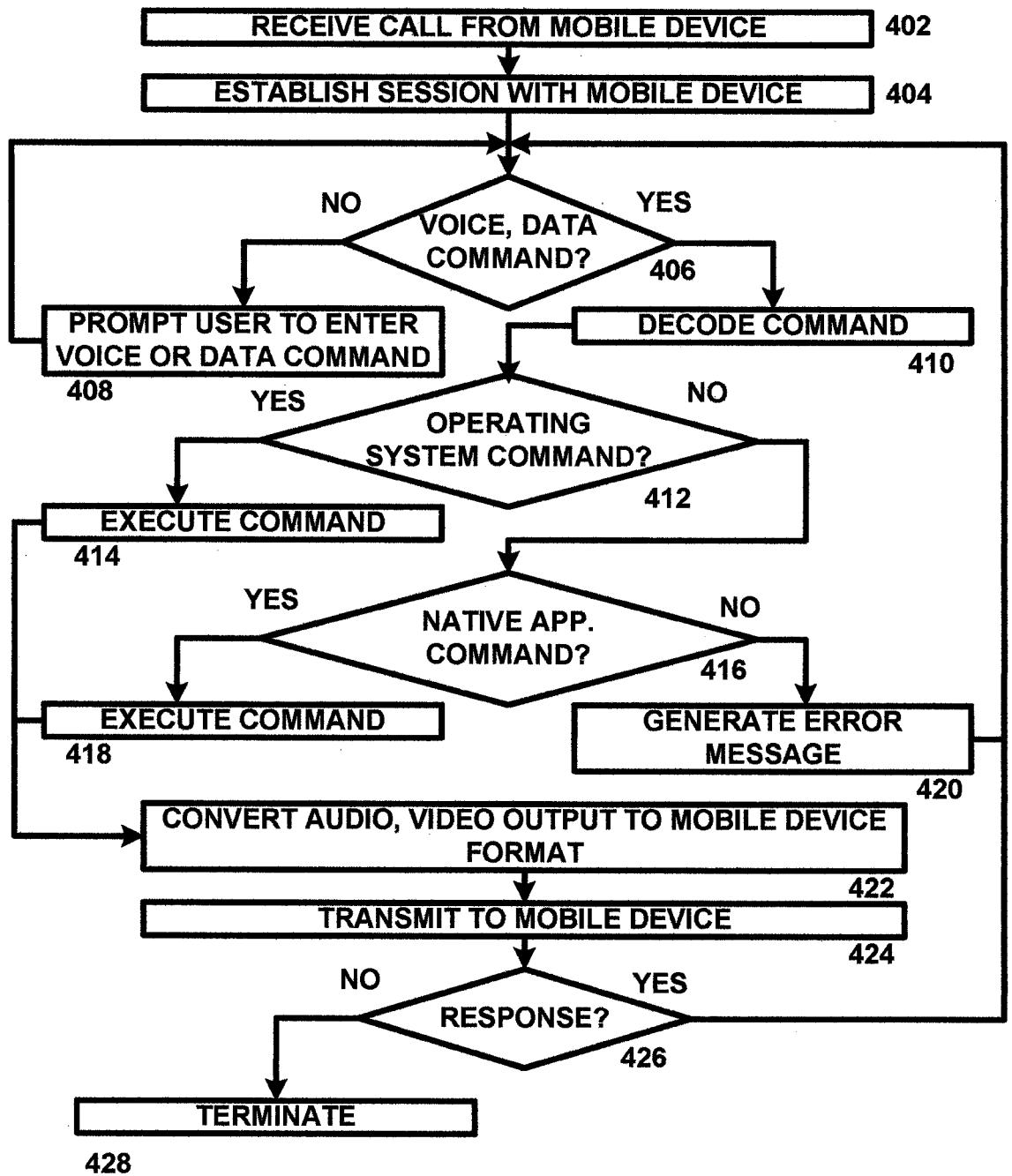
FIG. 4 is a diagram of a method for using voice commands from a mobile device to remotely access and control a general purpose computer in accordance with an exemplary embodiment of the present invention.

FIG. 4 is a diagram of method 400 for using voice commands from a mobile device to remotely access and control a general purpose computer in accordance with an exemplary embodiment of the present invention. Method 400 begins at 402 where a call is received from a mobile device. In one exemplary embodiment, the call can be received over a public switched telephone network, a wireless network, the internet, or other suitable networks. In another exemplary embodiment, the call can be encrypted or coded in other suitable manners. The method then proceeds to 404.

At 404, a session is established with the mobile device. In one exemplary embodiment, a session can be established utilizing mobile device identification and confirmation, utilizing a process such as a text password and person ID, a spoken or visual password and person ID where the person using the mobile device transmits audio or image data of themselves, which is confirmed using suitable processes at the general purpose processor, or in other suitable manners. In another exemplary embodiment, the image of the person using the mobile device can be compared with a plurality of their images using known image comparison processes to determine whether a match exists within a predetermined tolerance, allowing the person using the mobile device to be recognized in different states, such as with long hair, short hair, unkempt hair, with or without facial hair or make-up, or in other suitable states. The method then proceeds to 406.

At 406, it is determined whether a voice or data command has been received. If it is determined that a voice or data command has not been received, after a predetermined time, the method then proceeds to 408 where a prompt can be provided to the person using the mobile device to enter a voice or data command, or other suitable processes are performed. In one exemplary embodiment, the prompt can confirm that a session has been established with the mobile device and the general purpose processing platform or other suitable computer, and can allow or provide the person with available voice commands. Likewise, other suitable processes can also or alternatively be performed, such as receipt of data commands entered by a keypad entry or keyboard entry. If it is determined at 406 that a voice or data command has been received, the method then proceeds to 410.

At 410, the voice or data command is decoded. In one exemplary embodiment, a voice command can be decoded by determining the equivalent word for a spoken word, whereas a data command can be decoded by determining whether predetermined control data precedes the data that identifies it as a data command such as a key entry or other suitable data. The method then proceeds to 412.

At 412, it is determined whether the command is an operating system command. If it is determined that an operating system command has been received, the method then proceeds to 414 where the operating system command is executed. In this exemplary embodiment, an operating system command can be used to generate audio and video output data, such as a command to play a movie file using a video player of the operating system, or other suitable processes. In another exemplary embodiment, the operating system command can include a request to list available operating system commands, such that the operating system command executed at 414 is selected from a list of available operating system commands. In another exemplary embodiment, operating system commands such as "find" or "run" can be utilized in conjunction with spelling commands, such as where the person spells an alphanumeric file identifier or program name. The spelled name can then be repeated back to the person for confirmation, or other suitable processes can be used. In another exemplary embodiment, a document, spreadsheet, photographic image, audio recording, video recording, web page or other suitable data viewer/player can be used to find and view/play a document, spreadsheet, photographic image, audio recording, video recording, web page or other suitable data; and navigation commands such as "back" or "forward" can be used to navigate through a set of files of documents, spreadsheets, photographic images, audio recordings, video recordings, web pages, search results of such data, or other suitable data. The method then proceeds to 422.

At 422, the audio output data, video output data, or audio and video output data, generated at the computer is converted to a mobile device format. In one exemplary embodiment, the audio output data and video output data can be converted from a format generated at the general purpose processing platform to a format compatible with the mobile device, such as one having a reduced amount of data, a reduced number of pixels, reduced definition, reduced audio content, or other suitable formats that are optimized for the mobile device. In another exemplary embodiment, the audio output data and video output data can be converted into a format that excludes data that would not provide additional functionality, but would otherwise require excessive bandwidth requirements for transfer to mobile device 102. In another exemplary embodiment, the audio output data and video output data can be encrypted or coded in other suitable manners. The method then proceeds to 424.

At 424, the audio output data, video output data, or audio and video output data, converted to a mobile device format is transmitted to the mobile device. In one exemplary embodiment, the audio output data and video output data are coordinated with each other, so as to provide audio output that is correlated with video output, allowing video conferencing, playback of audio-visual data, or other suitable processes. In another exemplary embodiment, the audio output data can be transmitted without the video output data being transmitted. In another exemplary embodiment, the video output data can be transmitted without the audio output data being transmitted. In another exemplary embodiment, audio output data and video output data can be converted into a format that allows data transmission to the mobile device in accordance with the bandwidth available at the time of the transmission. The method then proceeds to 426.

At 426, it is determined whether a response has been received from the mobile device. If no response has been received, the method proceeds to 428 and terminates. Likewise, the person using the mobile device can be prompted to confirm whether or not they have received the converted audio output data, the converted video output data, or whether they are still active. A "ping" command or other suitable operations can also or alternatively be performed to determine whether a connection still exists with the mobile device. If a response is received at 426, the method then returns to 406.

If it is determined at 412 that an operating system command has not been received, the method then proceeds to 416 where it is determined whether a native application command has been received. In one exemplary embodiment, a native application command can include a request to list available native applications, a command to request a list of available native application commands (such as from an API), or other suitable native application commands. If it is determined at 416 that a native application command has been received, the method then proceeds to 418 where the command is executed. The method then proceeds to 422. Otherwise, if it is determined at 416 that the native application command has not been received, the method proceeds to 420 where an error message is generated. In one exemplary embodiment, the error message can include feedback to the person using the mobile device that the voice or data command received was not recognized as an available operating system or native application command. The method then returns to 406.

In operation, method 400 allows a person using a mobile device to remotely interact with a computer, whereby the person is able to command the computer from the mobile device and see and hear the images and sounds generated at the computer, in response to the commands received from the mobile device, in a manner similar to what the person would see and hear, if the person were directly and locally interacting with the computer.

Although exemplary embodiments of the system and method of the present invention have been described in detail herein, those skilled in the art will also recognize that various substitutions and modifications can be made to the systems and methods without departing from the scope and spirit of the appended claims.

What is claimed is:

1. A system for accessing and controlling a computer from a mobile device, comprising:
   the mobile device, wherein the mobile device is any hardware device capable of mobility;
   the computer, wherein the computer is a general purpose processing platform comprised of one or more discrete components;
   a communications medium that couples the mobile device to the general purpose processing platform; and
   an audio command interface, at the general purpose processing platform, the audio command interface:
   receives voice or data information from the mobile device;
   determines whether the voice or data information corresponds to a command; and
   selects, from at least one operating system and at least one application, one operating system or one application, wherein the audio command interface decides which is the appropriate operating system or application to execute at least one process in response to the command;
   wherein the at least one operating system or the at least one application is not required to be configured for interaction with the mobile device; and
   wherein the at least one process is executed at the general purpose processing platform with the selected operating system or application in response to the command.

2. The system of claim 1, wherein the communications medium is a wire-line communications medium.

3. The system of claim 1, wherein the communications medium is a wireless communications medium.

4. The system of claim 1, wherein the communications medium is an optical communications medium.

5. The system of claim 1, wherein the communications medium is an analog communications medium.

6. The system of claim 1, wherein the communications medium is a digital communications medium.

7. The system of claim 1, wherein the communications medium is wire-line, wireless, optical, analog, digital, or any combinations thereof.

8. A method of executing at least one process at a general purpose processing platform with an application, the method comprising:
receiving voice information, data information, or combinations thereof at an audio command interface at a general purpose processing platform, wherein the audio command interface comprises a contiguous system;
decoding the voice information or data information into a decoded command,
wherein for the voice information the decoding comprises determining one or more equivalent words for one or more spoken words included in the voice information,
determining whether the voice information is in a proper sequence to be received as a command and has occurred at a point in time to be interpreted as a command,
and determining whether at least one of the one or more equivalent words corresponds to a command, and
wherein for the data information the decoding comprises determining whether the data information includes keypad or keyboard entry data representing a command,
and determining whether control data included in the data information identifies the data information, or a portion thereof, as a command;
deciding an appropriate application to execute at least one process in response to the decoded command, wherein the deciding is performed by the audio command interface based upon the audio command interface evaluating the decoded command in relation to data from two or more sources; and
executing the at least one process at the general purpose processing platform with the appropriate application in response to the decoded command, wherein the executing is initiated by the audio command interface.

9. The method of claim 8, wherein the receiving comprises receiving the voice information, the data information, or the combinations thereof via a communications medium coupled to the general purpose processing platform.

10. The method of claim 9, wherein the communications medium comprises a network communications medium.

11. The method of claim 8, wherein the audio command interface is implemented in hardware, software, or a combination of hardware and software.

12. The method of claim 11, wherein the hardware comprises one or more discrete components.

13. The method of claim 11, wherein the software executes on one or more processors.

14. A method of executing at least one process at a general purpose processing platform with an operating system function, the method comprising:
receiving voice information, data information, or combinations thereof at an audio command interface at a general purpose processing platform, wherein the audio command interface comprises a contiguous system;
decoding the voice information or data information into a decoded command,
wherein for the voice information the decoding comprises determining one or more equivalent words for one or more spoken words included in the voice information,
determining whether the voice information is in a proper sequence to be received as a command and has occurred at a point in time to be interpreted as a command,
and determining whether at least one of the one or more equivalent words corresponds to a command, and
wherein for the data information the decoding comprises determining whether the data information includes keypad or keyboard entry data representing a command,
and determining whether control data included in the data information identifies the data information, or a portion thereof, as a command;
deciding an appropriate operating system function to execute at least one process in response to the decoded command, wherein the deciding is performed by the audio command interface based upon the audio command interface evaluating the decoded command in relation to data from two or more sources; and
executing the at least one process at the general purpose processing platform with the appropriate operating system function in response to the decoded command, wherein the executing is initiated by the audio command interface.

15. The method of claim 14, wherein the receiving comprises receiving the voice information, the data information, or the combinations thereof via a communications medium coupled to the general purpose processing platform.

16. The method of claim 15, wherein the communications medium comprises a network communications medium.

17. The method of claim 14, wherein the audio command interface is implemented in hardware, software, or a combination of hardware and software.

18. The method of claim 17, wherein the hardware comprises one or more discrete components.

19. The method of claim 17, wherein the software executes on one or more processors.

\* \* \* \* \*